(12) United States Patent
Ellis

(10) Patent No.: US 10,484,371 B2
(45) Date of Patent: Nov. 19, 2019

(54) DEVICE CONTROLLER SECURITY SYSTEM

(71) Applicant: Seagate Technology LLC, Cupertino, CA (US)

(72) Inventor: Jackson Ellis, Fort Collins, CO (US)

(73) Assignee: Seagate Technology LLC, Cupertino, CA (US)

( * ) Notice: Subject to any disclaimer, the term of this patent is extended or adjusted under 35 U.S.C. 154(b) by 162 days.

(21) Appl. No.: 15/601,234

(22) Filed: May 22, 2017

(65) Prior Publication Data

US 2018/0337916 A1      Nov. 22, 2018

(51) Int. Cl.
    H04L 29/06      (2006.01)
    H04L 9/08       (2006.01)
    G06F 21/44      (2013.01)
    G06F 21/55      (2013.01)
    H04L 9/32       (2006.01)

(52) U.S. Cl.
    CPC ......... *H04L 63/0853* (2013.01); *G06F 21/44* (2013.01); *G06F 21/554* (2013.01); *H04L 9/0866* (2013.01); *H04L 9/3226* (2013.01); *H04L 9/3278* (2013.01); *H04L 63/0876* (2013.01); *G06F 2221/2129* (2013.01); *H04L 63/126* (2013.01)

(58) Field of Classification Search
    None
    See application file for complete search history.

(56) References Cited

U.S. PATENT DOCUMENTS

| | | |
|---|---|---|
| 5,649,090 A | 7/1997 | Edwards et al. |
| 7,203,962 B1 | 4/2007 | Moran |
| 7,246,098 B1 | 7/2007 | Walmsley |
| 7,295,831 B2 | 11/2007 | Coleman et al. |
| 7,930,264 B2 | 4/2011 | Geppert |
| 8,010,469 B2 | 8/2011 | Kapoor et al. |
| 8,108,641 B2 | 1/2012 | Goss et al. |
| 9,389,650 B2 | 7/2016 | Bousquet et al. |
| 10,079,842 B1 * | 9/2018 | Brandwine ......... H04L 63/1416 |
| 10,257,192 B2 * | 4/2019 | Shin .................... H04L 63/0876 |
| 2003/0076957 A1 * | 4/2003 | Asokan .................. G06Q 20/04 380/270 |
| 2004/0260928 A1 * | 12/2004 | Immonen ............ H04L 63/0823 713/175 |
| 2007/0101146 A1 * | 5/2007 | Louch ..................... H04L 63/10 713/176 |
| 2007/0124650 A1 * | 5/2007 | Yoshiya .............. G06F 11/1076 714/770 |
| 2009/0276617 A1 * | 11/2009 | Grell ..................... G06F 21/575 713/2 |

(Continued)

FOREIGN PATENT DOCUMENTS

WO    WO-2015172352 A1 * 11/2015 ............. G06F 21/57

*Primary Examiner* — Piotr Poltorak
(74) *Attorney, Agent, or Firm* — Hall Estill Attorney at Law

(57) ABSTRACT

A computing device may accumulate behavior parameters of a controller or media with an authentication module of the controller prior to generating a unique signature with the authentication module. The unique signature can then be verified responsive to an initialization command from a host device before data is transferred by the controller between the host device and the media in response to the controller issuing at least one data access command.

19 Claims, 2 Drawing Sheets

(56) References Cited

U.S. PATENT DOCUMENTS

| | | | |
|---|---|---|---|
| 2010/0093432 A1* | 4/2010 | Tan | A63F 5/00 463/31 |
| 2011/0093703 A1* | 4/2011 | Etchegoyen | G06F 21/57 713/168 |
| 2011/0185397 A1* | 7/2011 | Escott | H04B 7/155 726/3 |
| 2011/0302638 A1* | 12/2011 | Cha | G06F 21/57 726/6 |
| 2012/0072736 A1* | 3/2012 | Kudoh | G11B 20/00188 713/189 |
| 2014/0108786 A1 | 4/2014 | Kreft | |
| 2016/0127131 A1* | 5/2016 | Tenenboym | H04L 9/3236 713/176 |
| 2016/0234185 A1* | 8/2016 | Ito | G11B 20/1258 |

* cited by examiner

DEVICE CONTROLLER SECURITY SYSTEM

SUMMARY

A computing device, in accordance with assorted embodiments, has a controller connected to a media. At least one behavior parameter of a controller or media is accumulated with an authentication module of a controller prior to generating a unique signature. The unique signature is then verified responsive to an initialization command from a host device before data is transferred by the controller between the host device and the media in response to the controller issuing at least one data access command.

DETAILED DESCRIPTION

Advancements in technology have allowed increasing amounts of data to be stored and accessed from remote physical locations via wired, or wireless, online connections. Such connectivity provides the ability for numerous different hosts to access computing systems and data without physically being present. While convenient, anonymous remote connectivity can expose a computing system to unwanted attacks, such as hacking and unauthorized users transferring and/or manipulating data.

An example system attack is a rollback where a system user forces a less secure version of protocol to be executed, which decreases the security associated with accessing data stored in the system. A rollback type attack can be implemented by performing a chip swap where a computing system processor is logically replaced with a unit that enables third-party access to various security features, such as encryption keys, decryption keys, data locations, and passwords, that would otherwise be protected and only accessible by authorized system hosts.

It is contemplated that a computing system processor can be verified as genuine via an authentication procedure. For instance, the serial number of a processor can be checked to verify that the processor has not been swapped. However, clever attackers can retrieve such fixed authentication information, such as via a cold boot attack or by monitoring data transfer during the chip verification procedure. Hence, there is a continued need for a more robust manner to authenticate a processor of a computing system to protect against chip swap and rollback type attacks.

Figure 1:
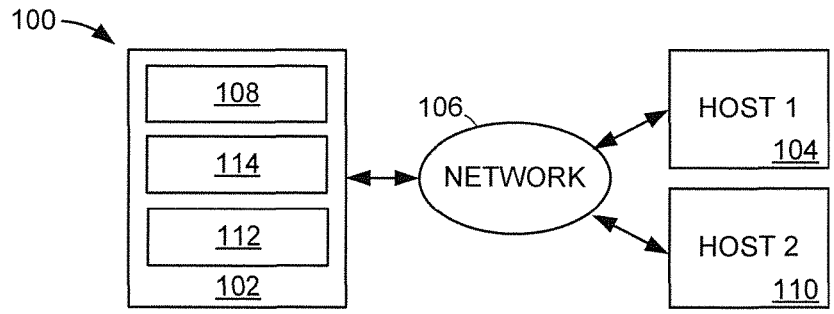
FIG. 1 displays a block representation of an example computing system in which various embodiments may be practiced.

FIG. 1 illustrates a block representation of an example computing system 100 that employs any number of data storage devices 102 in accordance with various embodiments. It is contemplated that the data storage device 102 is a part of a server, node, cloud computing rack, or individual computer that has access to at least one remote host 104 via a network 106. The computing system 100 can be configured to allow multiple remote hosts 104 concurrent and individual accesses to designated portions of a data storage device 102.

As a non-limiting example, a first remote host 104 can request data stored on a non-volatile memory 108 portion of the data storage device 102 while a second remote host 110 sends data to the data storage device 102 for temporary, or permanent, storage in the non-volatile memory 108. The data access operations provided by the data storage device 102 are directed by one or more controllers 112, such as a microprocessor or application specific integrated circuit (ASIC). The controller 112 can employ a security module 114 to process data and data requested and ensure only authorized users are transferring data in, or out of, the data storage device 102. The security module 114 may also be employed for assorted system-level tasks, such as system initialization and controller authentication.

Figure 2:
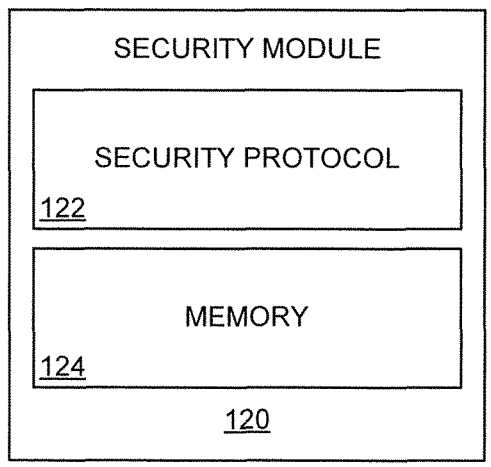
FIG. 2 is a representation of a portion of an example computing device capable of being utilized in the computing system of FIG. 1

FIG. 2 represents an example security module 120 that can be utilized by a computing system in accordance with some embodiments. It is noted that the security module 120 can be physically resident in a data storage device, in a controller, or at a remote location physically separated from a data storage device. The security module 120 can initiate, or react to, a request for data by applying any number of security protocol 122, which may involve encryption, decryption, and authentication, before accessing one or more non-volatile memory locations 124 to satisfy the request for data.

The security module 120 may be modified via a firmware update that is first authenticated before modifying the manner in which the security protocol 122 operates. While the security module 120 can be useful in preventing malicious activity for many data access requests, chip swap and rollback type attacks can circumvent, or alter, the operation of the security protocol 122 to allow an unauthorized host to control a computing system. Accordingly, various embodiments are directed to augmenting the security module 120 with circuitry that authenticates a device processor to prevent an attacker from bypassing the security protocol 122.

Figure 3:
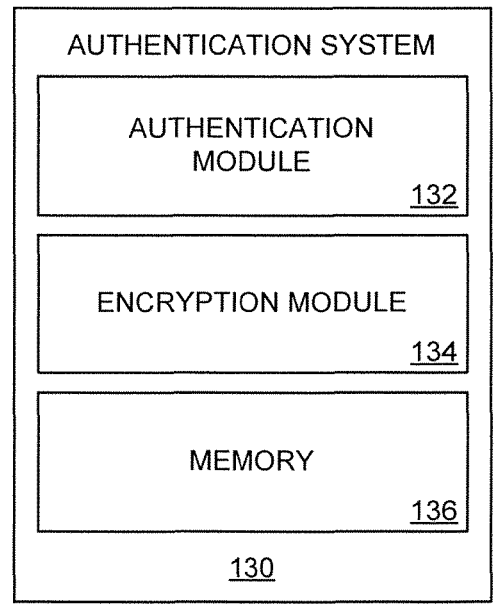
FIG. 3 conveys a portion of an example controller that may be employed in the computing system of FIG. 1 in accordance with assorted embodiments.

FIG. 3 depicts an example authentication system 130 that can be utilized by the security module 120, the data storage device 102, and the computing system 100 to ensure a local programmable processor is authentic and has not been logically swapped to grant system control to an unauthorized host. It is noted that an authentication module 132 can be physically located in a data storage device 102 as a stand-alone unit, a part of a printed circuit board (PCB), or part of a programmable controller/processor. Hence, the authentication module 132 is a physical component(s) that can execute predetermined activities as well as actions directed by a local, or remote controller.

The authentication module 132 can be continuously active while a computing system is powered on or may activate periodically in response to scheduled, or host initiated, events, such as data requests, data writes, and firmware updates. When the authentication module 132 is activated, circuitry can accumulate behavioral attributes and conditions of the computing system in which the authentication module is present. In other words, the authentication module 132 directs system resources to collecting data associated with the past behavior of the computing system as well as the authentication module 132 itself.

Although not limiting, the authentication module 132 can be configured to accumulate both fixed and variable parameters as well as environmental conditions to generate a unique signature that prevents chip swap and rollback type computing system attacks. It is noted that a behavior parameter can be any fixed or dynamic aspect of a local computing system controller, such as a data storage device controller 112. For example, fixed behavior parameters can be aspects that don't change over time or through operation, such as controller serial number, physical size, or computing capacity of the controller. Dynamic parameters can be aspects that do change over time and/or via operation of the controller, such as number of input output operations per second (IOPS), power consumption, overall time in service, and most recent signal destination.

It is noted that the unique signature generated by the authentication module 132 can pertain to the controller, the media, or both. The controller may have an on-chip fuse key that is not known outside of the security boundary within the chip. This fuse key is used as part of authentication so that swapping the controller chip with a new controller chip, which has a different fuse key, will not authenticate. However, there is not a root key signature like this on the non-volatile media, where information such as firmware and key drive parameters are stored. So, one rollback attack could be to capture a full non-volatile image at an earlier date and then swap the media to this image later in time. Thus, various embodiments proposed to solve this is to keep a counter using on-chip fuse, or non-volatile memory, that increments each time the media image is updated. Another, non-limiting method may be to detect that the media has been changed and that the combination of the controller and media signature, such as power or performance parameters, has had a sudden change at a given, or derated, operating condition.

Accordingly, assorted embodiments have the controller or media as candidates for being swapped and base parameters on the combined mated performance/power factors for the controller and media. For example, in NAND flash, 64 flash die can be connected to the controller and each flash die may have a different power/performance characteristic added to the controller power/performance, which increases overall security of the system against side channel attacks.

The authentication module 132 can direct the logging of the fixed and dynamic controller parameters along with the collection of various environmental conditions, such as humidity, temperature, and time, as inputs into one or more algorithms that compute at least one unique signature that identifies the controller. It is contemplated that the authentication module 132 directs the continuous, or sporadic, logging of data access activities to a local memory that can be utilized by the algorithm(s) to further customize the unique signature. It is contemplated that the unique signature is a single value, string of multiple values, or plurality of separate values that can be collectively used to verify the identity of the controller.

While the inputs to the authentication module 132, such as the aggregated fixed parameters, can be stored locally in the controller or in the local memory of the data storage device, such storage location can be susceptible to attacks from unauthorized hosts. Hence, various embodiments accumulate the assorted fixed parameters, dynamic parameters, environmental conditions, and logged past activity in response to system initialization and/or when controller authentication is requested and store those aspects outside of the controller, and in some embodiments outside of the data storage device, such a in a remote memory.

Although accumulating controller parameters on demand and storing the unique signature as one or more values remotely can increase the security of a computing system and decrease the risk of third party attacks, additional security measures can be conducted to ensure the unique signature cannot be discovered without authorization. For instance, the output signature from the authentication module 132 can be encrypted by an encryption module 134 that utilizes one or more encryption means, such as secure hash algorithm (SHA), block cipher, or compression function. As a result of the encryption module 134, the unique signature can be stored as one or more separate pieces in a remote non-volatile memory 136 positioned outside of the data storage device of the controller and authentication module 130.

Figure 4:
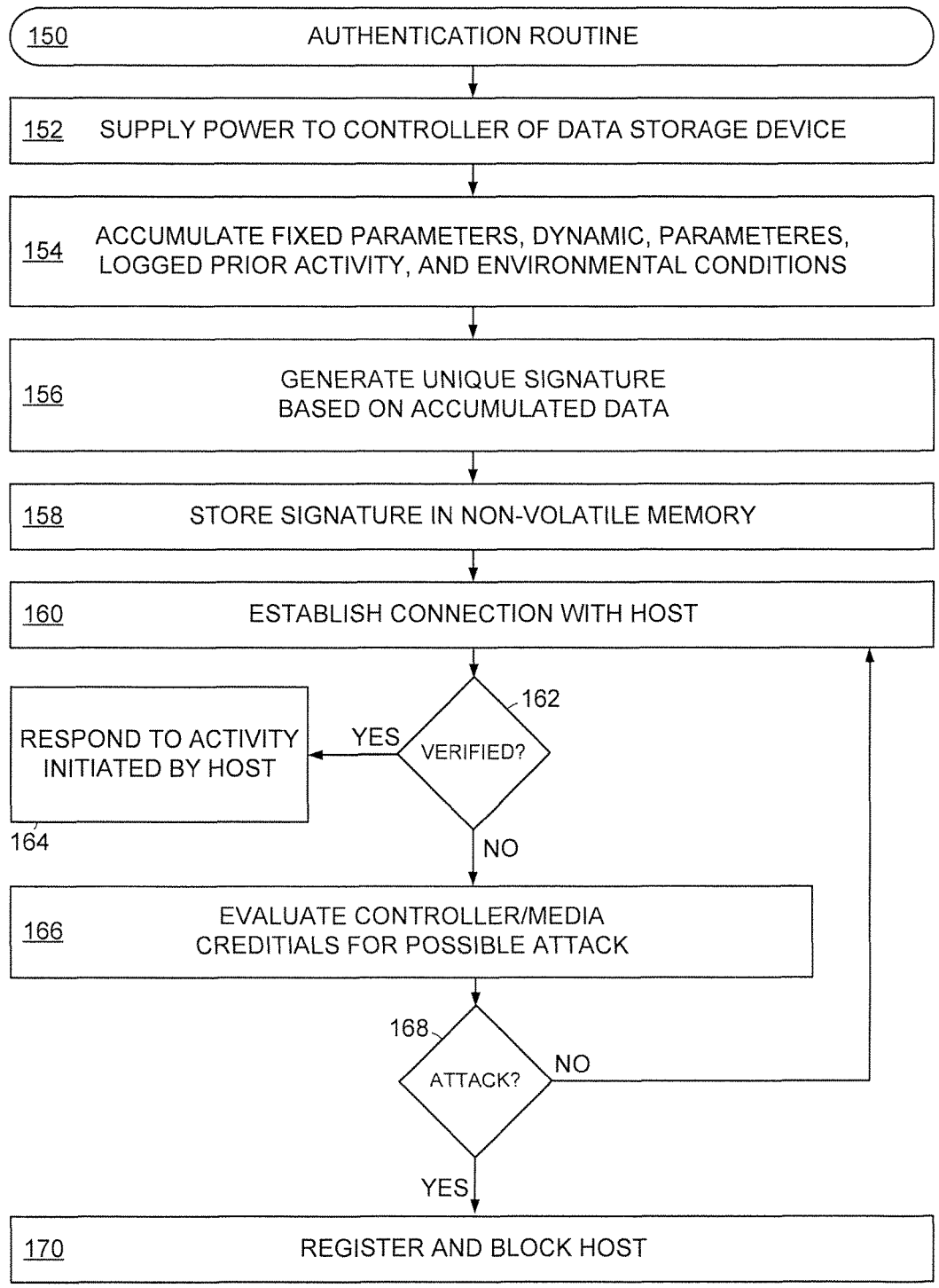
FIG. 4 conveys a flowchart of an example controller authentication routine that can be carried out by the computing system of FIG. 1 in accordance with some embodiments.

FIG. 4 is a flowchart of an example authentication routine 150 that can be employed by a computing system constructed and operated in accordance with various embodiments. Initially, a computing system is configured with at least one data storage device equipped with a local controller that has an authentication module. Step 152 supplies power to the computing system and start an initialization procedure in at least one data storage device.

The initialization procedure can trigger step 154 to accumulate fixed parameters, dynamic parameters, logged prior controller activity, and environmental conditions stored in one or more locations external to the controller, such as in a different remote non-volatile memories of the computing system. As a non-limiting example, a computing system with multiple separate data storage devices can respectively store parameters of a controller of a different data storage device so that the parameters that make up the unique signature of a particular data storage device are distributed in the computing system.

It is noted that step 154 may conduct one or more processing operations, such as loading a data access table or executing a test pattern through the controller and/or media, to accumulate the various parameters, past activity, and conditions that are then utilized by the authentication module of the controller being characterized in step 156 to generate a unique signature. Step 156 can employ any number of different algorithms and signal processing to produce a signature that is one or more values to identify the controller and/or media based upon behavioral characteristics of that particular controller.

It is contemplated that step 156 may advance routine 150 to encrypt some, or all, of the values of the unique signature prior to step 158 storing the signature value(s) in remote non-volatile memories of the computing system. The various aspects of steps 154, 156, and 158 can be characterized as a signature generation procedure that can be done at any time, and any number of times, during the life of a controller. That is, a unique signature may be generated via steps 154-158 during every data storage device startup, after a previous signature has been active for a predetermined amount of time, such as after one hour or one day, or in response to a detected computing system event that could be an attack.

Regardless of when and how many signatures are created, the routine 150 begins to establish a connection with a host in step 160 after a unique signature is in place for each data storage device of the computing system. As part of step 160, the identity of a controller and/or media is provided via the signature. Decision 162 then compares the signature to verify the controller/media is the unit that was previously used to generate the signature, which prevents a chip swap attack from imitating and/or circumventing the controller. If decision 162 verifies the controller/media as authentic, step 164 responds to any data access operations from the connected host.

In the event decision 162 encounters an anomaly in the signature that prevents the controller/media from being verified, step 166 evaluates the controller/media credentials provided by the host for a possible malicious attack. Step 162 can compare the signature provided by the remote host with known malicious tactics, such as providing the controller serial number alone, media identification, or a keyed hash message authentication code (HMAC) stored in the controller, to determine if the host is a threat. In some embodiments, the authentication module may store trap values in the controller in an attempt to catch potential attacks with step 166.

A determination that the false signature was part of an attack in decision 168 triggers step 170 to register and block computer system access to that particular host. Other consequences may additionally be performed, such as providing false data back to the host, to mask that the attack has failed. If the false signature is not identified as malicious, routine 150 returns to the connection with a host in 160. Through the steps and decisions of routine 150, the integrity of the data storage devices of a computing system are more secure due to the generation of a signature that is based on more than mere fixed values stored locally in the controller, or data storage device, itself.

With the utilization of a variety of different types of behavioral information about a controller and/or media to generate a unique signature, the identity of the controller/media can be authenticated through a sequence of one or more test accesses that confirm the same controller is being employed. The storage of a unique signature in one or more remote locations further secures the identity of the controller and media while preventing malicious attacks from circumventing a controller and conducting data access operations that compromise the integrity of data stored in the computing system.

What is claimed is:

1. A method comprising:
   accumulating at least one behavior parameter of a controller of a data storage device with an authentication module of the controller during data access operation of the controller;
   generating a unique signature of the controller with the authentication module of the controller based on the at least one behavior parameter;
   connecting a first host device to the controller;
   providing a first signature to the controller from the first host device;
   rejecting a first data access command from the first host in response to the first signature not matching the unique signature;
   connecting a second host device to the controller;
   providing a second signature to the controller from the second host device;
   verifying the second signature matches the unique signature responsive to an initialization command from the second host device to confirm the second host device is trusted; and
   transferring data between the second host device and the non-volatile memory with the controller in response to the controller issuing a second data access command.

2. The method of claim 1, wherein the behavior parameter consists of at least one fixed parameter and at least one dynamic parameter pertaining to the controller.

3. The method of claim 2, wherein the at least one dynamic parameter is power consumption of the controller.

4. The method of claim 2, wherein the at least one dynamic parameter is a number of data accesses conducted by the controller.

5. The method of claim 2, wherein the at least one dynamic parameter is a number of input output operations per second of the controller.

6. The method of claim 2, wherein the authentication module further utilizes at least one environmental condition around the controller to generate the unique signature.

7. The method of claim 1, wherein the authentication module processes the accumulated behavior parameters with at least one algorithm to generate the unique signature.

8. The method of claim 1, wherein the unique signature is encrypted by an encryption module of the controller.

9. The method of claim 1, wherein the unique signature comprises at least one value.

10. A method comprising:
    accumulating at least one behavior parameter of a media by an authentication module of a system controller during data access operation of the media;
    generating a unique signature of the media with the authentication module based on the at least one behavior parameter;
    connecting a first host device to the controller;
    providing a first signature to the controller from the first host device;
    rejecting a first data access command from the first host in response to the first signature not matching the unique signature;
    connecting a second host device to the controller;
    providing a second signature to the controller from the second host device;
    verifying the unique signature responsive to an initialization command from the second host device connected to the system controller and data storage device to confirm the second host device is trusted; and
    transferring data between the second host device and the media with the system controller in response to the system controller issuing a second data access command.

11. The method of claim 10, wherein the unique signature is generated upon startup of a computing system of which the system controller is a part.

12. The method of claim 10, wherein the authentication module characterizes the first signature as an attack on the system controller.

13. The method of claim 10, wherein the unique signature is divided into multiple values stored in different memory locations within a computing system.

14. The method of claim 13, wherein the different memory locations are each remote from the system controller.

15. The method of claim 10, wherein the at least one behavior parameter consists of data access operations conducted by the system controller.

16. The method of claim 10, wherein the system controller is resident in a data storage device.

17. The method of claim 16, wherein the data storage device is one of many different data storage devices that collectively comprises a computing system.

18. The method of claim 10, wherein the unique signature is generated upon system controller startup and again in response to connection with the host device.

19. The apparatus of claim 10, wherein the media comprises a non-volatile memory.

* * * * *